United States Patent Office 3,708,561
Patented Jan. 2, 1973

3,708,561
PROCESS FOR PRODUCING NON-WOVEN
FILAMENTARY STRUCTURE
Kohei Horimoto, Masaharu Kawamura, Susumu Norota, and Mitsuhiko Okui, Ibaraki, Japan, assignors to Teijin Limited, Osaka, Japan
Filed Nov. 3, 1970, Ser. No. 86,527
Claims priority, application Japan, Nov. 5, 1969, 44/88,625
Int. Cl. B29d 7/14
U.S. Cl. 264—22
7 Claims

ABSTRACT OF THE DISCLOSURE

A non-woven filamentary structure having superior bulkiness and bulk-durability is produced by feeding a continuous or non-continuous multifilament, such as a polyester tow, into an electric potential field formed between a pair of endless belts moving at an equal speed in the same direction, at a speed not lower than the speed at which the endless belts are moving thereby expanding the multifilament in a configuration of a non-woven filamentary structure to fill the electric potential field like cotton candy, and then withdrawing the structure from the electric potential field. Preferably, the starting multifilament is treated with an antistatic agent such as anionic and nonionic surfactants prior to being fed into the electrical potential field.

---

This invention relates to a process for producing a non-woven filamentary structure having improved properties by an easy operation and with good reproducibility of quality. More specifically, the invention relates to a process for producing a non-woven filamentary structure having such desirable properties as high strength, uniform opacity, uniform permeability and isotropic drapability and possessing remarkably improved bulk-durability in the thickness direction of the structure obtained.

According to a first aspect of the invention, a process is provided for producing a non-woven filamentary structure which comprises forming an electric potential field in spaces among endless belts spaced from one another and moving at an equal speed in the same direction, feeding a non-continuous or continuous multifilament having a length not less than two times the distance between two adjoining belts into the electric potential field at a speed not less than the speed at which the endless belts are moving thereby expanding the multifilament in the form of a non-woven filamentary structure in the electric potential field so as to fill the spaces forming the electric potential field, and withdrawing the non-woven filamentary structure from the electrical potential field.

According to a second aspect of the invention, an apparatus is provided for producing a non-woven filamentary structure which comprises endless belts spaced from one another and moving at an equal speed in the same direction, means for forming an electric potential field in the spaces between belts, supply means for supplying a non-continuous or continuous multifilament between two adjoining belts in the moving direction at a speed not less than the speed at which the belts are moving, and conveyor belts for receiving the multifilament expanded in the form of a non-woven filamentary structure in the electric potential field so as to fill the electric potential field and discharged from between two adjoining endless belts in the moving direction and withdrawing the non-woven filamentary structure from electric potential field.

Various proposals have been made for the production of a non-woven filamentary structure composed of staple fibers or substantially of staple fibers which comprises disrupting spinning materials or spinning filaments in a plastic state by exerting the action of an electrical potential field thereon, and allowing the staple fibers so produced to collide with a collecting screen belt or screen drum utilizing the action of a conveying gas fluid or jet and to be deposited thereon (for instance, U.S. Pat. 2,336,745 and German Pat. 896,402).

It is also known by British Pat. 418,226 for instance to produce a web-like wound-up product of continuous filaments having substantial parallelism among the individaul filaments by imparting an electrostatic charge to a continuous multifilament to separate it into its individual filaments and collecting them on a collecting device of the type described above utilizing a conveying gas fluid or jet.

A method for producing a non-woven filamentary structure having superior isotropic and uniform properties but having no substantial parallelism is also known from Japanese patent publication No. 4993/1962, which process comprises imparting a sufficient electrostatic charge to continuous multifilaments running with a conveying gas jet, releasing the filaments from the tension given by the jet prior to collision with, and collection by, a collecting means after leaving a jet device, separating the filaments from one another by using the repulsive force due to the electrostatic charge, and collecting the separated filaments.

Furthermore, U.S. Pat. 3,358,436 discloses a process for spreading continuous multifilaments, which comprises imparting electric conductivity to the materials by applying an electrically conductive liquid thereto, and then applying thereto an electric current of at least 5,000 volts, thereby spreading the materials into individual filaments.

The proposals of the U.S. Pat. 2,336,745 and German Pat. 896,402 are intended to omit complicated and disadvantageous means of forming continuous multifilaments and cutting them to form staple filaments or forming them into a non-woven filamentary structure, and to produce staple filaments or a non-woven filamentary structure containing such staple filaments at a bound by disrupting spinning materials or spinning filaments in a plastic state under the action of electrical potential. The staple filaments so obtained, however, are substantially undrawn filaments and not feasible at all. Such a product finds only limited applications, and a non-woven filamentary structure composed of such undrawn staple filaments does not possess a quality comparable to that of a similar structure composed of drawn filaments.

The proposals of British Pat. 418,226 and Japanese patent publication 4993/1962 are intended to separate continuous multifilaments by imparting electrostatic charge thereto, feeding the charged filaments to a collecting means by the action of a conveying gas fluid or jet, and separating the filaments utilizing the repulsive force of these filaments due to the electrostatic charge. However, like the proposals of U.S. Pat. 2,336,745 and German Pat. 896,402, the non-woven filamentary structure is formed on the collecting means.

The proposal of U.S. Pat. 3,358,436 mentioned above only teaches that continuous multifilaments can be separated and spread by utilizing an eletcrostatic repulsive force.

The inventors noted that the non-woven filamentary structure formed by utilization of electrical or electrostatical potential attains its configuration for the first time on the collecting means, and in order to achieve superior isotropic and uniform properties and no substantial parallelism required of such a structure, the control of operation, especially release from tension, collecting, the linear speed of the conveying gas fluid or jet, and the amount of electrostatical potential, etc. is considerably complicated and needs care; that a device for conveying a gas fluid or jet is essential; and that the structure obtained has insufficient bulkiness and is especially poor in bulkiness in the direction of it thickness, which makes it quite unsuitable for use in carpets, cushioning linings for furniture, and the like and unsatisfactory in bulkiness and bulk-durability in the direction of its thickness or capability of recovering the original shape. With these in mind, they have been engaged in extensive studies for the improvement of such a non-woven filamentary structure.

It has been found consequently that continuous or non-continuous multifilaments can be expanded into a non-woven filamentary structure configuration filling an electric potential field by feeding the continuous or non-contistatic agent prior to feeding into the electrical potential field, into the electrical potential field formed between endless belts, without using a conveying gas fluid or jet or without exerting any tension on the filaments in the direction of withdrawal, at a speed not less than the speed at which the belts are moving, preferably an overfeeding speed.

Without providing any particular collecting means, a non-woven filamentary structure can be obtained according to the present invention merely by withdrawing the structure discharged from the electrical potential field by means of a conveyor belt, for instance. The structure so obtained has favorable bulkiness in the direction of its thickness, superior bulk-durability and other desirable properties such as high strength, uniform opacity, uniform permeabilitly and isotropic drapability.

It has also been found that according to the process of the present invention, a non-woven filamentary structure of structure having the aforementioned improved properties with good reproducibility of quality by an easy operavention will become apparent from the description which method and apparatus for forming a non-woven filamentary structure formed by utilization of electrical or electrostatical potential.

Accordingly, an object of the present invention is to provide a process for producing a non-woven filamentary structure having the aforementioned improved properties with good reproducibility of quality by an easy operation using an apparatus of simple structure.

Many other objects and advantages of the present invention will become apparent from the description which follows.

In the present invention, the non-woven filamentary structure configuration is formed in a state where it fills an electrical potential field formed in spaces between endless belts moving in the same direction at an equal speed. This is very characteristic over the conventional method and apparatus for forming a non-woven filamentary structure formed by utilization of electrical or electrostatical potential.

Figure 1A:
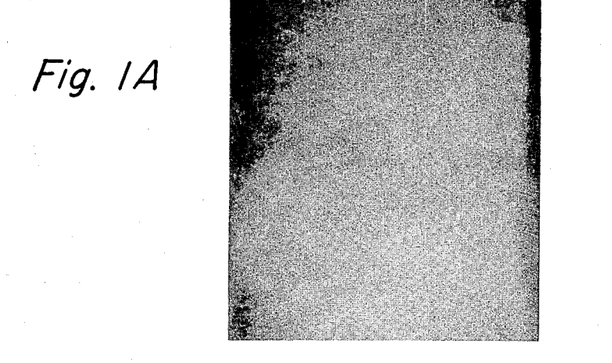
Figure 1B:
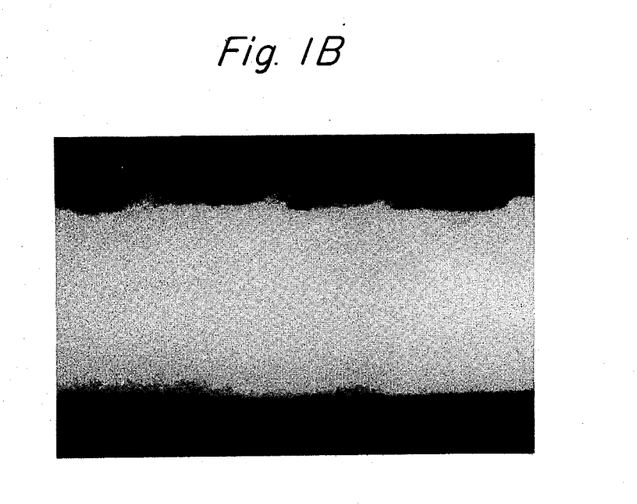

The reason for the formation of the above-mentioned structure is not necessarily clear. But for obtaining good results, it is especially desired that prior to being fed to an electric potential field, multifilaments are treated with an antistatic agent. When filaments are fed into an electrical potential field after substantially removing a treating agent (treating agent for imparting antistatic properties to the filaments and making the operations easy) applied in such post-spinning steps as drawing and wind-up, a satisfactory expanding phenomenon does not occur with ease. It is assumed from this that the main action of separating the individual filaments is not at least by an electrostatic repulsive force due to electrostatic charge given to the filaments, but this main action constitutes a similar action as the separating action disclosed in the aforementioned U.S. Pat. 3,358,436, and that unique separating action, accompanying bending action, interlacing action, convoluting action, entangling action, etc. occurs at the same time in conjunction with a complicated combination of physical conditions such as the speed of moving of the endless belts which form an electric potential field, the overfeed conditions for the filaments to be fed, the electric potential for formation of an electric potential field, and the spaces between the belts, whereby a unique non-woven filamentary structure configuration such as shown in FIG. 1–a will be formed in a state filled within the electric potential field. FIG. 1–b shows a photograph of the same structure after discharge from the electric potential field. It is especially thought that a bending action as shown in FIG. 2 occurs in each filament together with the separating or spreading action, and either restricts or promote the latter actions; and that the unique configuration shown in FIG. 1–a expands as a whole by these various actions.

It should be of course understood that the scope of the present invention is in no way limited by such assumption or conjecture.

Figures 2, 3:
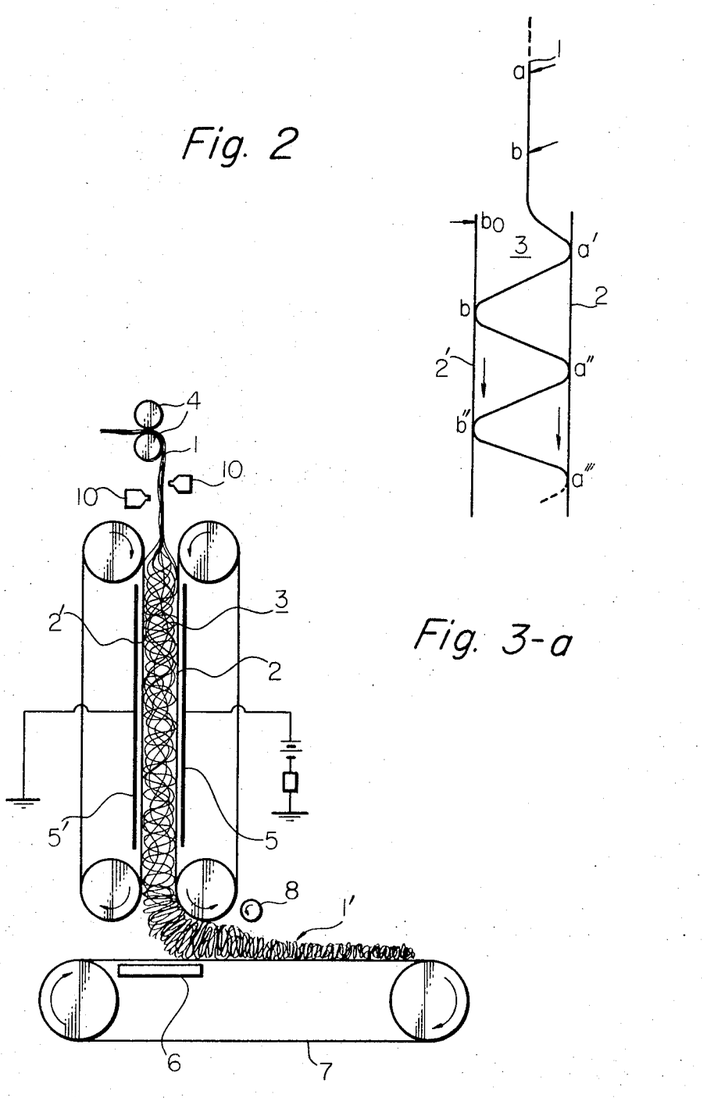
Figure 3:
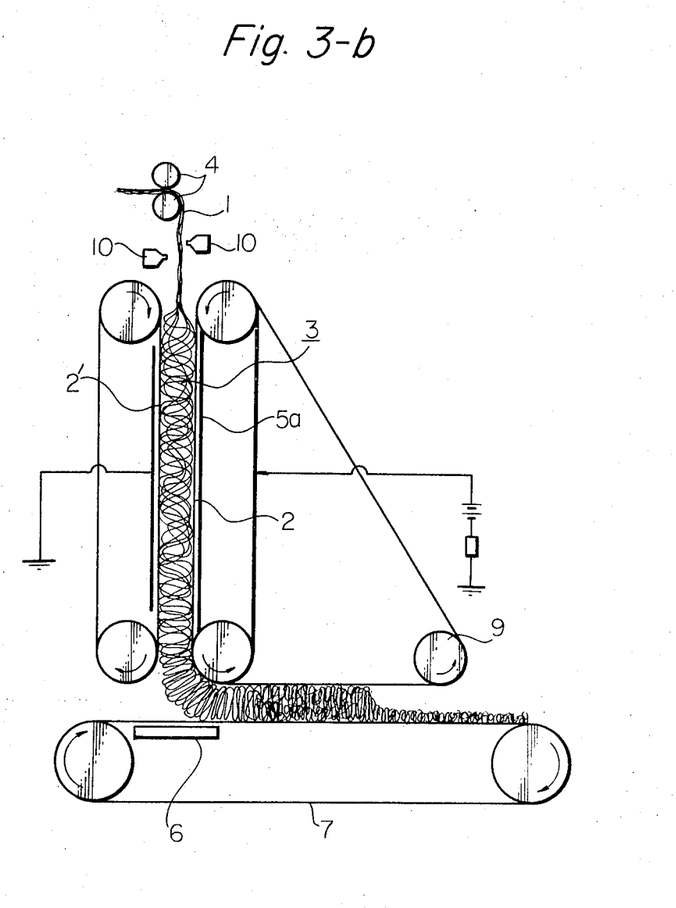

FIG. 2 is a model drawing for illustration of the aforementioned bending action. In the figure, reference numerals 2 and 2' represent portions of a pair of endless belts which face an electrical potential field 3 formed between the belts. The belts move at an equal speed in the direction shown by arrow in the drawing. A continuous filament 1 to be overfed is shown as an embodiment of being fed from above to below. Referring to FIG. 2, the filament attached to point $a'$ of the belt portion 2 moves towards point $a''$ by the movement of the belts. The point $b$ is attached to point $b_0$ on the belt portion 2', and conveyed to point $b'$. When the belts further move and point $a''$ moves to point $a'''$, point $b'$ moves to point $b''$. When the belts further move, and point $a$ attached to point $a'$ moves to point $a''$, point $b$ is attached to point $b_0$ and conveyed to point $b'$. Thus, the action of bending the filament in a shape shown by the wavy configuration in the drawing occurs. It is observed that such an action also occurs in a direction at right angles to FIG. 2 by the influence of the deviation of the filaments along the belt surfaces which may take place at the time of feeding the filaments. Accordingly, this bending action is not planar, but three dimensional. Of course, not all of the filaments are bent in this way as FIG. 2 is a model drawing. It is considered that basically, such a bending action occurs in each of the filaments in an electric potential field. It is conjectured that the propensity of the filaments to be arranged in a direction of the thickness of the web-like structure owing to such a bending action contributes to the imparting of bulkiness and bulk-durability to the structure obtained by the process of the invention.

In any cases, a non-woven filamentary structure configuration is formed by the process of the present invention in an electrical potential field defined by endless belts.

The process of the invention will be further described with reference to the accompanying drawings.

FIGS. 3–a and 3–b show schematic side elevations of several examples of vertical-type apparatus used in the process of the present invention, and FIGS. 4–a, 4–b and 4–c show schematic side elevations of several examples of the transverse-type apparatus.

Figure 4:
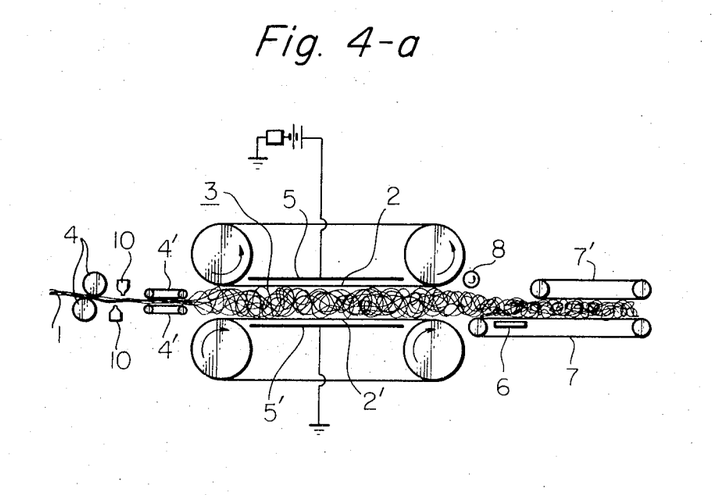

Each of the apparatus shown in FIG. 3–a, FIG. 3–b, FIG. 4–a, and FIG. 4–b comprises endless belts 2, 2' moving at an equal speed in the same direction with a space 3 therebetween; means for forming an electrical potential field in the space 3, such as electrode plates 5, 5' or metal belt 5a; means for supplying continuous or uncontinuous multifilaments to an inlet portion of the space in the direction of movement of the belt at a speed not less than the speed of the belts, for instance, feed rolls 4, 4' or feed hold belts 4', 4'; and a conveyor belt 7 for receiving the multifilaments expanded in a non-woven filamentary structure configuration filling the electric potential field and discharged from an outlet opening of said space 3 in the direction of movement of the belts and withdrawing them from the electric potential field.

FIG. 4–c shows a structure similar to that described above, but in this embodiment, an extension 7″ of the endless belt 2' forming the space 3 serves as the conveyor belt. Accordingly, it should be understood that the term conveyor belt 7, as used in the present invention, includes an extension of the endless belts which form the space 3.

In FIGS. 3-a and 3-b, a pair of endless belts 2 and 2' arranged vertically move at an equal speed in the downward direction in the drawings by rotary rollers rotating in the direction shown by the arrow. The space 3 is formed between the endless belts 2 and 2', and an electric potential field is formed therein. The formation of an electric potential field may be performed in various ways. In FIG. 3-a, of electrode plates 5 and 5' disposed in spaces surrounded by the belts 2 and 2' in proximity to the space 3 between the pair of belts, electrode plate 5' is grounded. Thus, the endless belt 2' is indirectly grounded via the electrode plate 5', and electric potential is applied to the other electrode plate 5 to form an electrical potential field in the space 3. In FIG. 3-b, a metal belt 5a is used instead of the electrode plate 5 to form an electric potential field.

Figure 8:
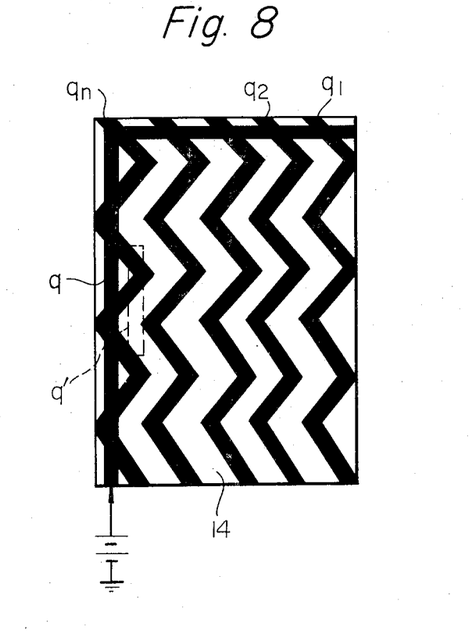

As such belt-like electrode, a belt-like electrode, such as shown in FIG. 8, can be used which has been made of a belt body 14 of an electrically non-conductive material and in which an electrically conductive portion of a suitable shape such as wavy configuration and made of metal deposited bands or metal woven or knitted bands $q_1, q_2 \ldots q_n$ (connected to one another) is provided, and if desired, an electrical potential applying zone $q$ is provided at a proper place. Instead of $q$, an electrical potential applying electrode $q'$ may be used.

Figure 6:
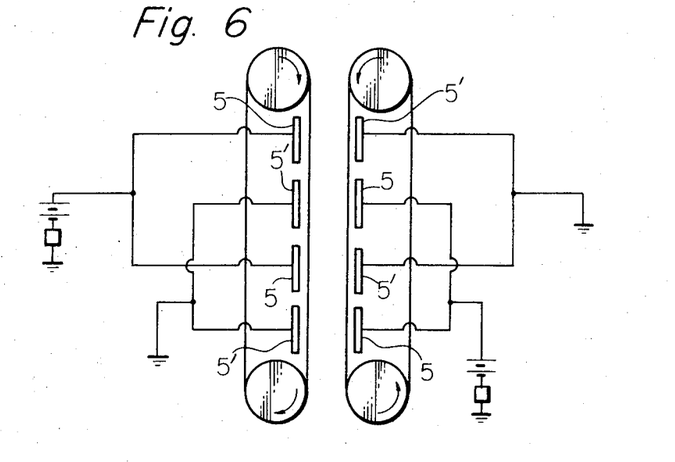

The electrode may be of complicated type as is shown schematically by FIG. 6 which is a side elevation. Further, as is shown in FIG. 3-b, the endless belts may be constructed of belts having good electrical conductivity or metal belt 5a, and one of the belts is directly grounded, while an electrical potential is applied to the other, thus enabling the belts themselves to act as electrodes. Usually, however, combinations of electrodes are used with endless belts made of electrically non-conductive materials, for instance, films, sheets, laminates, woven and knitted goods and non-woven goods of synthetic high-molecular-weight substances such as polyvinyl chloride, polyolefins, polyesters, polyamides, polyacrylonitrile, fluorine resins, polyimides and regenerated cellulose, natural fibrous substances such as cotton or flux, inorganic fibers such as glass fibers and asbestos and natural or synthetic rubbers, or other belt base materials coated or laminated with the above-mentioned substances. Antistatic agents such as high-molecular-weight surfactants may be applied to the surfaces of these belts, and such application is preferred. It is also possible to render one of the belts electrically conductive, and the other electrically non-conductive, and use it is conjunction with an electrode.

Most preferably, the electric potential field is formed, as shown in FIG. 3-a for instance, by directly or indirectly grounding one of a pair of endless belts and applying a positive or negative electrical potential directly or indirectly to the other. But it is also possible to apply positive or negative voltages having a potential difference directly or indirectly to both of the endless belts. If desired, it is possible to apply a positive voltage to one of the endless belts and a negative voltage to the other, either directly or indirectly. In this instance, it is not necessary that there be a difference in the absolute value of electric voltage. The last-mentioned embodiment does not as greatly exert the action of expanding filaments into a nonwoven filamentary structure configuration as compared with the first two embodiments.

Figure 5:
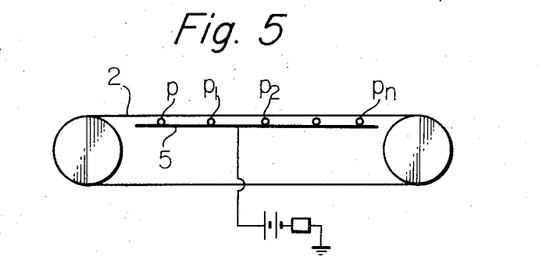

Usually, the electrodes are provided considerably in proximity of belts 2, 2' which form the space 3, and therefore, the belts often move in contact with the electrodes. If desired, such a contact may be avoided by providing a plurality of rollers $p, p_1, p_2, \ldots p_n$ of insulating or non-conducting materials between the electrode 5 and the belt 2, as is shown in FIG. 5.

Figure 7:
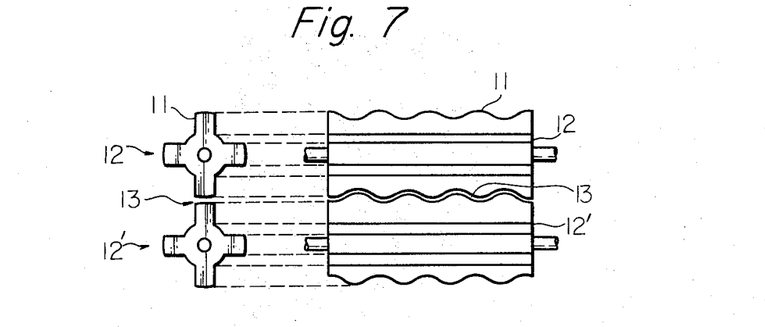

It is preferred that a bundle of filaments be fed to the electrical potential field after having been spread by a suitable means and made into a flat filament bundle in which the filaments are arranged in parallel with one another to the largest possible extent. Such spreading can, for instance, be performed by passing the filament bundle through space 13 between a pair of rollers 12 and 12' having a plurality of wavy projections 11, as shown in FIG. 7 as front and side elevations. Any other known methods can be used which result in the rough prevention of adhesion or entanglement among the individual filaments of the filament bundle and can form a flat tow of paralleled filaments.

In the process of the invention, it is desirable that the starting multifilaments be treated with an antistatic agent prior to being introduced into an electrical field formed in the space 3. Usually, when a treating agent (most commonly, surface active agents) has been applied after spinning in order to perform post-treatments such as drawing smoothly, and not particularly removed, it is not necessary to effect the treatment with the antistatic agent. But in order to ensure the expanding effect according to the process of the invention, it is often preferred that an antistatic agent be applied by means of a spray 10 provided as shown in FIGS. 3-a and 3-b for instance. There is no need to apply such antistatic agent to both sides of the flat tow 1, and the provision of only one spray 10 will suffice. It is also possible to apply air occasionally to the flat tow by means of an air supplying device before introduction into an electrical potential field, and thus give incentive to the filaments to be spread and expanded, and also cause deflection in the direction of belt surfaces.

As the treating agents or antistatic agents, the following can be used, for instance, water, aqueous solutions of surface active agents and aqueous solutions of inorganic electrolytes. Suitable examples of the surface active agents include anionics such as sulfuric acid ester salts of higher alcohols, phosphoric acid ester salts of aliphatic alcohols, sulfonic acid salts of aliphatic amines and aliphatic amide types, or salt of alkylarylsulfonic acids, cationics such as salts of aliphatic amines, alkyl quaternary ammonium salts or alkyl pyridium salts, nonionics such as polyoxyethylene alkyl ethers, polyoxyethylene alkylphenols, polyoxyethylene alkylesters, or sorbitan alkyl esters, and amphoterics such as carboxylic acid types (betaines), sulfonic acid types (imidazolines), phosphoric acid ester types or sulfuric acid ester types. These surface active agents may be used alone or in combination in an amount of 0.05 to 5.00% based on the weight of the fiber. The examples of the inorganic electrolyte include LiCl, NaCl, MgCl, and AlCl used either alone or in combination in an amount of 0.05 to 1.00% based on the weight of the fiber. They are adhered to the fiber or incorporated into the inside of the fiber.

Especially effective are phosphoric acid ester salts of aliphatic alcohols for polyester fibers, and sulfonic acid type amphoteric surface active agents (imidazolines) or sorbitan alkyl esters for polyamide fibers.

Referring to FIG. 3-a, a non-continuous or continuous multifilament having a length more than twice as large as the distance between the belts 2 and 2' is introduced into an electrical potential field formed in the space 3 by means of feed rollers 4. In this example, an antistatic agent is applied to the filament by means of a spray 10 prior to the introduction. When the filament has entered the electrical potential field, it undergoes a complicated mixture of unique separating and spreading actions, for example, bending action, interlacing action, convoluting action, and entangling action as mentioned above, and is three-dimensionally expanded into a unique non-woven filamentary structure configuration resembling cotton candy, filling the space 3, as shown in FIG. 1-a. In this state, the filamentary structure is attached to the endless belts moving at an equal speed, and moves together with the belts. It is then discharged from the outlet portion of the space between the belts and received on the conveyor belt 7. The provision of an electrical-type or air suction-type attracting device 6 is provided preferably on the back of the conveyor belt 7 in the vicinity of the opening in order to ensure the receiving of the filamentary structure on the conveyor belt 7, increase the random nature of the structure and prevent it from being taken away sucked and adhered to the moving endless belts. FIG. 3–a illustrates an example wherein a scraping roller 8 is provided to prevent the structure from being further taken away by the moving endless belts. The scraping roller 8 may have a scraping means such as a brush on its electrically insulated surface.

The non-woven filamentary structure which has been conveyed towards the right side in the drawing by the conveyor belt 7, when reaching the point without the influence of the electrical potential field, is spontaneously reduced in its bulk. It seems that at this time, the wavy shapes of the filaments in the widthwise direction of the structure are entangled with one another or bended to ensure the bulkiness of the structure and increase its bulk-durability.

In the process of the present invention, the use of continuous multifilaments is preferred, but non-continuous multifilaments may also be used if they have a length such as to form the aforementioned unique and complicated non-woven filamentary structure configuration. Staples having a length at least twice as large as the distance between the belts forming the space 3 can also be used in the present invention.

Any of natural, regenerated and synthetic fibers can be used for this purpose, and if desired, fine denier glass fibers may also be utilized. These are used either alone or in admixture. As the fillers, fibers having a length smaller than two times the distance between the belts may be used in admixture.

It is also possible to use several kinds of filaments having a different shrinkage upon heating, and also crimped filaments.

In FIG. 3–b, the endless belt 2 to which electrical voltage has been applied is extended by a rotary roller 9 to a position which is under no influence of an electrical potential field, and thus it is possible to prevent the structure taken out of the electrical potential field from being taken away attracted and adhered in the direction of moving the belt 2.

FIGS. 4–a, 4–b and 4–c show model apparatus. In these embodiments, feed holding belts 4' are utilized in addition to the feed rollers 4 in order to make it easy to supply a tow of filaments into an electrical potential field from a transverse direction. Of course, the supplying may be performed by means of feed rollers or feed holding roller alone. In FIGS. 4–a, a belt 7' which forms a holding conveyor belt together with the conveyor belt 7 is utilized. In FIG. 4–b, as previously stated with respect to FIG. 3–b, the endless belt 2 is extended to a position without influence of the electrical potential field. In FIG. 4–c, the endless belt 2' is similarly extended, and the extended part 7'' acts as a conveyor belt.

In the present invention, the distance between endless belts, namely the distance of the space 3, the electrical voltage to be applied to electrodes for the formation of an electrical potential field, the speed at which the endless belts move and the speed of feeding the filaments have effects on one another, and are chosen properly to expand the filaments into the desired non-woven filamentary structure configuration.

For example, in the embodiments shown in FIGS. 3–a, 3–b, 4–a, 4–b and 4–c in which one of the endless belts is grounded and a positive or negative electric voltage is applied to the other, the distance between the endless belts is not more than 20 cm., preferably 18 to 5 cm., and the electrical voltage suited therefor is not less than 10,000 volts, preferably more than 12,000 volts. Usually, 15,000 to 100,000 volts or so may be used. The speed of feeding the filaments must not be smaller than the speed at which the endless belts are moving, and preferably, the filaments are overfed. Usually, the speed ranges from the speed equal to the moving speed of the endless belts to the speed five times as fast as that, preferably 1.1 to 4 times, more preferably 1.2 to 3.5 times as fast.

The moving speed of the belts may be properly varied depending upon the feeding speed of the filaments and the distance between the belts, etc. The most commonly used speed is, for instance, 0.1 m./min. to 60 m./min. The residence time of the filaments in the electrical potential field is usually 1 to 30 seconds, but may be longer if desired.

In an embodiment where a positive or negative voltage is applied to one of the endless belts and a positive or negative voltage having a higher potential is applied to the other, electrical voltages having a potential difference of about the voltage mentioned above are applied, and a substantially similar distance between the belts and filament feeding speed can be employed.

It is preferred in the present invention that the non-woven filamentary structure obtained should be taken out of the electrical potential field at a speed not higher than the speed at which the endless belts are moving. The speed should be such that it does not substantially exert a pulling force on the structure formed in the electrical potential field, and any speed can be employed which is higher than the speed below which a continuous feeding of the filaments into the electrical potential field becomes impossible.

The non-woven filamentary structure formed by the process of the present invention is subjected to proper means to apply an adhesive, and then by drying or curing, the interlacing of the filaments in the structure may be set. For instance, an adhesive solution is applied by spraying, immersion or other suitable means, or an adhesive resin powder is applied by spraying or air spray. Thereafter, the structure is dried or cured, and if desired, embossed, whereby the non-woven filamentary structure configuration can be set. In an alternative embodiment, it is possible to set the configuration only by the heat curing means by using a mixture of the above-mentioned filaments and a filament having a different melting point as the starting filaments.

The invention will further be described by the following examples in which the bulkiness and bulk-durability were measured by the following methods.

BULKINESS

A plurality of samples with an area of 10 cm.² were cut from the non-woven filamentary structure obtained (not treated with an adhesive). The samples were stacked until the total weight reached 10 g. The resulting sample mass was placed on a sample stand of a compression tester, and held by a compressing plate. A compressing force of 1 gr./cm.² was exerted on the sample mass, and the height ($h_0$) of the sample mass was then measured and expressed in millimeters. The value obtained showed bulkiness.

BULK-DURABILITY

After completion of the foregoing test, the compression force was increased gradually to 4 gr./cm.², and then the sample mass was gradually released from the compression force. After complete release from the compressing force, the sample was allowed to stand for a while in this state. Thereafter, the compression and releasing and standing were repeated. This cycle was repeated three times per minute. At this time, the ratio of the time ($t_1$) required for compression and releasing to the standing time ($t_2$) was adjusted to 1:3. The above cycle was repeated 70 times, and then the sample was released from the compression force. After completion of 70 times repetition, the height ($h_{70}$) of the sample mass was measured, and expressed in millimeters. This value showed bulk-durability.

EXAMPLE 1

An apparatus of the type shown in FIG. 3–b was used. A polyester tow (1.5 denier per filament; total denier of 90,000; number of crimps 8 turns per inch) was subjected to tensioning and releasing using the device illustrated in FIG. 7, and spread in a width of 500 mm. The widened tow was fed at a rate of 8.4 m./min. into an electrical potential field formed between a pair of endless belts (2, 2′, 5a) moving at 6.0 m./min. The resulting non-woven filamentary structure was then taken out of the electrical potential field, and accumulated on a conveyor belt moving at 2.5 m./min. The belt 2′, 5a had a length of 750 mm. and a width of 700 mm., and was made of 90 mesh wire gauze (SUS 27). The belt 2 had a width of 700 mm. and was made of a 150μ thick polyethylene film the surface of which had been treated with a sulfonic acid type amphoteric surface active agent. The distance between the belts 2 and 2′ was 125 mm., and a direct current of −24,000 volts was applied to the belt 5a.

The resulting filamentary structure was good in bulk. The bulkiness ($h_0$) was 184 mm., and the bulk-durability ($h_{70}$) was 61 mm.

A non-woven cloth obtained by bonding the resulting filamentary structure with an acrylate-type bonding agent had the following properties.

| | |
|---|---|
| Thickness mm | 0.28 |
| Weight per unit area gr./m.$^2$ | 96 |
| Pick-up of the bonding agent percent | 30 |
| Tenacity: | |
| Warp kg./cm. | 2.5 |
| Weft kg./cm. | 2.1 |

The ratio of the number of wefts to that of warps in an optional area of 1 cm.$^2$ of the cloth was 0.81 on an average.

EXAMPLE 2

An apparatus of the type illustrated in FIG. 4–c was used. Electrode 5′ was omitted, and an electrode belt was used. A polyester tow (1.5 denier per filament; total denier of 200,000) was spread in a width of 1,000 mm., and fed at a rate of 6.3 m./min. into an electrical potential field formed between a pair of belts 2 and 2′ moving at 2.1 m./min. The electrode belt 2′ (grounded side) had a length of 1,000 mm. and a width of 1,200 mm., and was made of 60 mesh wire gauze (SUS 27). The belt 2 (electrode side) had a length of 1,000 mm. and a width of 1,200 mm., and was made of a polyester taffeta fabric treated with an alkylaryl sulfonic acid salt. The electrode 5 was made of a 1 mm. thick steel plate (SS 34) with a length of 700 mm. and a width of 1,000 mm. A current of −30,000 volts was applied between the belts 2 and 2′ spaced from each other by a distance of 150 mm.

The tow was overfed into the electrical potential field formed between the belts. The resulting non-woven filamentary structure was good in bulkiness and bulk-durability, which respectively showed a value of 164 mm. and 57 mm.

What is claimed is:

1. A process for producing a non-woven filamentary structure which comprises forming an electrical potential field in spaces among endless belts spaced from one another and moving at an equal speed in the same direction, feeding a continuous multifilament pretreated with an antistatic agent selected from the group consisting of water, an aqueous solution of a surface active agent and an aqueous solution of an inorganic electrolyte at a speed not less than the speed at which said endless belts are moving, thereby expanding said multifilament in a configuration of a non-woven filamentary structure in said electrical potential field so as to fill said spaces forming the electrical potential field, and withdrawing said non-woven filamentary structure out of said electrical potential field.

2. The process of claim 1 wherein said multifilament is a crimped multifilament.

3. The process of claim 1 wherein said surface active agent is used in an amount of 0.05 to 5.00% based on the weight of said multifilament.

4. The process of claim 1 wherein said inorganic electrolyte is used in an amount of 0.05 to 1.00% by weight based on the weight of the multifilament.

5. The process of claim 1 wherein said surface active agent is selected from the group consisting of anionics selected from sulfuric acid ester salts of higher alcohols, phosphoric acid ester salts of aliphatic alcohols, sulfonic acid salts of aliphatic amine and aliphatic amide types and salt of alkylarylsulfonic acids, cationics selected from salts of aliphatic amines, alkyl quaternary ammonium salts and alkyl pyridium salts, nonionics selected from polyoxyethylene alkyl ethers, polyoxyethylene alkylphenols, polyoxyethylene alkyl esters and sorbitan alkyl esters, and amphoterics selected from carboxylic acid types (betaines), sulfonic acid types (imidazolines), phosphoric acid ester types and sulfuric acid ester types.

6. The process of claim 1 wherein said inorganic electrolyte is selected from the group consisting of lithium chloride, sodium chloride, magnesium chloride and aluminium chloride.

7. The process of claim 1 wherein said non-woven filamentary structure is taken out of said electrical potential field at a speed not greater than the speed at which said endless belts move.

References Cited

UNITED STATES PATENTS

| | | | |
|---|---|---|---|
| 2,385,873 | 10/1945 | Melton | 264—24 |
| 2,442,880 | 6/1948 | Schwartz | 19—155 |
| 2,468,827 | 5/1949 | Kennedy | 19—155 X |
| 2,158,415 | 5/1939 | Formhals | 28—1 |
| 3,580,735 | 5/1971 | Shimodoi et al. | 28—75 |

ROBERT F. WHITE, Primary Examiner

R. R. KUCIA, Assistant Examiner

U.S. Cl. X.R.

19—155; 28—1, 75; 264—24, 168